United States Patent [19]

Hare

[11] Patent Number: 5,575,103
[45] Date of Patent: Nov. 19, 1996

[54] PERFORATED FISHING ROD

[76] Inventor: Gerard M. Hare, Route 425, Northwest Miramichi, Red Bank, R.R. # 1, New Brunswick, Canada, E0C 1W0

[21] Appl. No.: 280,155

[22] Filed: Jul. 25, 1994

[30] Foreign Application Priority Data

Sep. 17, 1993 [CA] Canada .................. 2106455

[51] Int. Cl.⁶ ............................................. A01K 87/00
[52] U.S. Cl. ................................... 43/18.1; 43/24
[58] Field of Search ........................ 43/18.1, 24

[56] References Cited

U.S. PATENT DOCUMENTS

| | | | |
|---|---|---|---|
| 1,409,282 | 3/1922 | Condley | 43/24 |
| 1,595,275 | 8/1926 | White | 43/18.1 |
| 1,799,501 | 4/1931 | Casler | 43/18.1 |
| 2,282,618 | 5/1942 | Stewart | 43/18.1 |
| 2,324,429 | 7/1943 | Rondelli | 43/18.1 |
| 2,334,646 | 11/1943 | Price | 43/18.1 |
| 2,735,208 | 2/1956 | Barletti | 43/24 |
| 2,776,516 | 1/1957 | Jennette | 43/24 |
| 2,777,239 | 1/1957 | Cushman | 43/18.1 |
| 3,102,358 | 9/1963 | Steinle | 43/24 |
| 3,862,509 | 1/1975 | Petersen, Jr. | 43/18.1 |
| 4,212,126 | 7/1980 | Barnett | 43/24 |
| 5,159,776 | 11/1992 | Horton et al. | 43/24 |
| 5,299,377 | 4/1994 | Akiba | 43/18.1 |

FOREIGN PATENT DOCUMENTS

| | | |
|---|---|---|
| 1192924 | 10/1959 | France . |
| 1350730 | 12/1964 | France . |
| 1574826 | 7/1969 | France . |
| 1592422 | 6/1970 | France . |
| 2029828 | 10/1970 | France . |

*Primary Examiner*—Kurt Rowan
*Attorney, Agent, or Firm*—R. G. Bitner

[57] ABSTRACT

A fishing rod in which the line passes internally through a hollow shaft and wherein the shaft includes a plurality of perforations spaced longitudinally along the shaft. The perforations serve to reduce wetness within the shaft, and the reduction in wetness reduces friction and drag between the line and the internal surface of the hollow shaft. The internal surface of the shaft may be provided with contact reducing irregularities and one or more coatings of materials such as water repellent, anti-frictional, reinforcing and/or wear resistant materials to further enhance properties such as the dispersal of water, reduction of friction and the structural integrity of the rod.

16 Claims, 1 Drawing Sheet

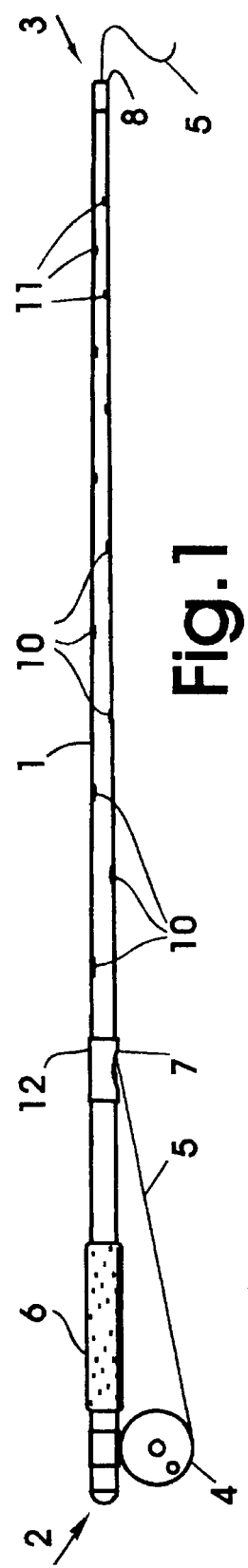
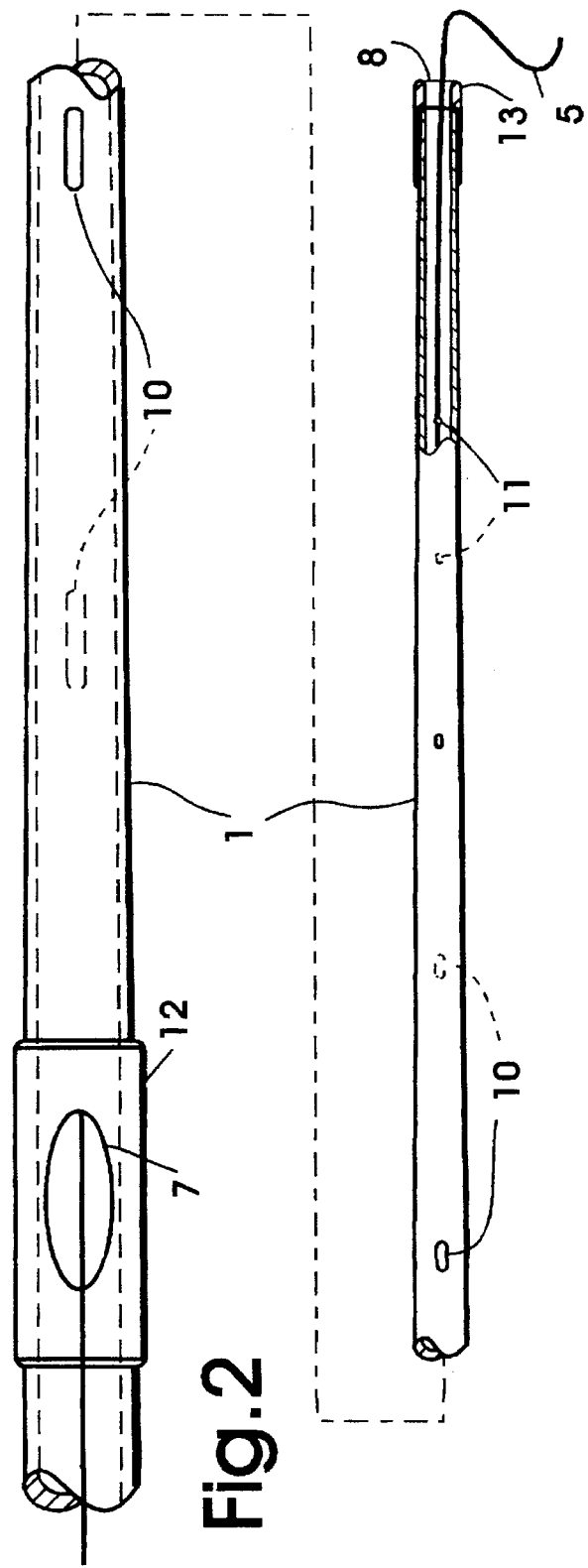

5,575,103

PERFORATED FISHING ROD

FIELD OF THE INVENTION

This invention relates to a fishing rod, and particularly to a fishing rod of the type in which a line is guided inside a hollow shaft.

BACKGROUND OF THE INVENTION

Conventional fishing rods have external guides through which a line passes from an attached reel. Fishing rods with conventional external guides are subject to problems such as breakage or damage of the guides during use and transport, and entanglement of the fish hook and line during use.

Fishing rods in which the line passes internally through a hollow shaft have been proposed in an attempt to overcome the problems associated with conventional external guides. Many of the prior proposals related to fishing rods with the line guided internally have focused on minimizing contact, the cause of friction and wear, between the line and the internal surface of the hollow shaft by the use of internal guides. These internal guides may interfere with the sensitivity of a fishing rod, and may be difficult or impossible to repair if they break or become displaced.

A major problem with fishing rods, of the type in which the line is guided internally, is the problem caused by wetness, or water associated with the line or shaft. The friction and/or drag caused by a wet line reduces the possible casting distance and sensitivity of the rod. This problem is particularly severe for fly casting where a relatively large diameter line is used. For spin and other casting rods, the problem caused by wetness may not be immediately apparent, but becomes so after extended usage. Furthermore, it appears that the friction caused by a wet line would result in wear of the internal surface of the shaft.

SUMMARY OF THE INVENTION

An object of the present invention is to provide an improved fishing rod of the type in which a line is guided inside a hollow shaft, and particularly to reduce the adverse effects of drag and/or friction caused by wetness in the shaft.

It has been found that providing a hollow fishing rod with perforations along its longitudinal axes reduces wetness and drag and/or friction inside the shaft core by allowing entry of air and dispersal of water from the interior of the shaft. Although the mechanism is not clearly understood, it is believed that the relative motion of the rod through the air while casting forces air in, and air and water out, of the perforations. Back casting forces air through perforations near the top while forward casting forces entry of air near the bottom. The intake of air during casting disperses water, mainly in the form of droplets, through perforations, particularly in the tip region of the shaft. Also, it is believed that the perforations provide venting of the inner shaft which facilitates the movement of air and water within the shaft. Also, centrifugal forces resulting from the casting action is believed to contribute to the disposal of water droplets by forcing water droplets to travel along the inner shaft to a perforation or the tip end opening where water can exit the shaft.

It was found that further improvement in performance can be obtained by providing irregularities on the inner surface of the perforated hollow shaft and coating the inner surface of the shaft with one or more of water repellent, antifrictional and wear resistant materials, such as fluorochemical compounds, in order to facilitate dispersal of water from the shaft and/or minimize friction between the line and the inner surface of the shaft.

The present invention provides a fishing rod having a butt end and tip end, wherein the rod comprises a hollow shaft defining an inner passageway for a line extending from a point near the butt end to the tip end; the shaft having a line entrance opening near the butt end, and a tip end opening for the line at the tip end; and the shaft having a plurality of perforations disposed between the line entrance opening and the tip end.

BRIEF DESCRIPTION OF THE DRAWINGS

FIG. 1 is a side view of an embodiment of the fishing rod of the present invention.

FIG. 2 is a partly sectioned bottom view of portions of the fishing rod of FIG. 1 showing details of the perforations, line entrance opening and tip end.

DESCRIPTION OF THE PREFERRED EMBODIMENTS

The fishing rod shown in FIGS. 1 and 2 comprises a hollow shaft 1 having a butt end 2 and tip end 3. The rod as shown includes a number of conventional components such as a reel 4, line 5 and handle 6. The line 5 enters and leaves the shaft 1 through a line entrance opening 7 and tip opening 8.

In accordance with the present invention the shaft 1 is provided with a plurality of perforations 10 and 11 spaced longitudinally along the shaft. The perforations 10 and 11 are distributed about the circumference of the hollow shaft such that some of the perforations are disposed at a bottom portion of the shaft and some of the perforations are disposed at a top portion of the shaft. Preferably the location of adjacent perforations will alternate between the top and bottom.

The perforations 10 and 11 may be of any suitable size, shape and number that provide for the entry and flow of air through the shaft for the dispersal of water, and at the same time do not adversely affect the structural integrity of the fishing rod. Increasing the size and number of perforations facilitates the dispersal of water. However, extremely large and/or closely spaced perforations tend to decrease the strength of the shaft. The perforations will preferably have rounded edges to avoid stress concentration. The adverse effects of perforations on strength can be alleviated by the judicious use of construction materials and techniques, or by reinforcing the perforations, as will be described.

In the preferred embodiment as shown in the drawings, some of the perforations 10 are in elongated form with decreasing longitudinal length from the butt end to the tip end, and with the circular perforations 11 near the tip end.

It appears that suitable perforation size, expressed in terms of perforation area should be in the range of 10 to 50% of the inside diametrical area of the shaft in order to provide sufficient air flow and at the same time provide adequate structural integrity of the shaft. With a glass fibre shaft, the optimal size of the perforations was found to be about 15% to 40% of the internal diametrical area of the rod shaft.

The number of perforations 10 and 11 in the fishing rod will be related to the length and taper of the rod. The larger the number of perforations, or the smaller the spacing between adjacent perforations, the larger the air flow for water dispersal. However, spacing the perforations too closely can adversely affect the structural integrity of the shaft. It appears that suitable spacing of the perforations, to accommodate perforations of varying sizes, is in the range of 5 to 50 times the inner diameter of the shaft. The preferred spacing to accommodate perforations of varying sizes appears to be in the range of 10 to 30 times the inner diameter of the shaft.

The shaft, in the region of the line entrance opening 7, is preferably provided with reinforcing means, shown in the form of a sleeve 12, to reinforce the shaft and reduce wear at the line entrance opening 7. The line entrance opening 7 will preferably have smooth rounded edges to reduce friction. Also, the line entrance opening 7 will preferably have an oval shape, and size sufficient to allow easy entry of the line. Further, the location of the line entrance opening 7 will preferably be such that the line 5, when taut, does not contact the rear surface of the opening which would otherwise produce additional friction.

The tip end opening 8, where the line exits from the hollow shaft 1, may be provided with reinforcing means with smooth rounded edges such as the cylindrical shaped metal element 13, as shown in FIG. 2, or a bell shaped element moulded from metal containing compounds. Alternatively, the shaft may be constructed of material having wear resistant properties inherent in the construction of the shaft. Preferably the inner diameter of the tip element 13 will be equal to the inner diameter of the extreme tip region of the shaft 1 to allow the unrestricted movement of a fishing line 5.

Preferably the inner surface of the shaft is provided with an irregular surface for reducing contact area of the line with said inner surface. It appears that such irregularities reduce the contact of the line with water in the shaft and hence reduces line drag. The irregularities of the inner surface may be in the form of a spiralled ridge and/or depression, transverse ridges, or a pebbled, wavy or undulating pattern.

The inner surface of the shaft is preferably coated with a wear resisting, anti-frictional, and hydrophobic or water repellant material, such as a composition containing a fluorochemical, for example, polytetrafluoro-ethylene. The use of a hydrophobic material is believed to enhance the dispersal or disposal of water by facilitating the movement of water droplets to the perforations.

As with conventional rods, the shaft of the present invention may be made in a single section or a plurality of sections. The rod may be constructed, in whole or in part, of materials such as glass fibre, carbon fibre, glass-carbon fibre, or other material suitable for construction of a hollow shaft with perforations. Preferably the butt end of the shaft 1 to the line entrance opening 7 is constructed of carbon fibre, or other suitable material for stiffness and lightness, and the perforated portion of the shaft to the tip end opening 8 is constructed of glass fibre or other suitable material for flexibility and durability.

The internal diameter of the shaft must be sufficiently large to allow for the free movement of a fishing line 5, and water which may be adhering to it, and to allow the formation of perforations 10 and 11 and the line entrance and exit openings.

EXAMPLE

Following are details of an example for the construction of fishing rods that were found to be suitable for fly, spin and bait casting.

Rods with a hollow shaft 1 were provided with perforations 10 and 11 and a line entrance opening 7, as shown in the drawings. The shaft was constructed of graphite from the butt end to the line entrance opening, and glass fibre from the line entrance opening to the tip opening. The shaft was constructed of thick walled glass for strengthening immediately forward of the line entrance opening. The rods were about 1.8 to 2.7 meters in length with inside diameters of about 8 to 10 mm at the butt end and 2.0 to 2.8 mm at the tip end. The perforations 10 and 11 were arranged linearly along the bottom and top of the fishing rod with the length of perforations decreasing towards the tip end region in concert with the taper of the rod, as shown in FIG. 2. The perforations were disposed alternately on the bottom and top of the shaft. Rods with shafts of various perforation sizes, shapes and spacing were tested. Shafts with perforation areas of about 20% to 30% of the shaft inside diametrical area and spaced apart from about 50 to 100 mm, or about 10 to 20 times the inner diameter of the shaft were found to be satisfactory in terms of dispersal of water and structural integrity. With the rods tested, the best results were obtained with a shaft having perforations in the form of slots over the major length of the shaft and circular apertures in the small diameter region of the tip end. Longitudinally extending slots in the mid-portion of the shaft were found to be considerably more resistant to breakage than circular apertures, for perforations of the same area. The slots, 1.6 to 2 mm in width, were formed with a circular diameter at each end of each slot. The longitudinal length of the slots decreased in length from about 7 to 10 mm near the line entrance opening to about 3mm, and further decreased to 1.6 mm circular apertures in the tip region. The slots were spaced 60 to 100 mm apart in the mid-portion of the shaft and 50 to 80 mm apart in the tip region.

The inner surface of shaft was roughened, cleaned with a solvent (acetone), and coated with a epoxy steel resin. Epoxy resin was applied around and in the vicinity of each perforation 10 and 11. A spiralled ridge was formed in the epoxy resin on the inner surface of the shaft extending throughout about two-thirds of the shaft length from the line entrance opening to the tip end. A reinforcing sleeve 14, made of double layered glass fiber, was mounted in the area of the line entrance opening 7. It was found that the use of a reinforcing sleeve 14 did not impair the sensitivity or casting efficiency of the fishing rod. The inner surface of the shaft was coated with a water repellant material (a concentrated polymer containing Teflon™) over the coating of epoxy resin.

The fishing rods as constructed above were found to be efficient in dispersing water and providing relatively long distance casting as compared with conventional rods. At the same time the perforations did not adversely affect the durability of the rod.

The inner shaft of several rods were provided with irregularities in the form of a spiralled ridge and depression formed in the inner epoxy coating. It was found that such rods were superior in performance, allowing longer casting distances, as compared with rods not having such internal structure.

Wear on the inner surface of the shaft was found not to be a problem. The absence of inner guides, such as used in prior rods, appears to avoid local wear by spreading it out.

It will be appreciated that details of construction, such as the need for reinforcing, wear resisting or water repellant coatings will vary dependant on the properties of the material used for construction of the shaft.

It will also be understood that the size, shape and spatial arrangement of the perforations, as well as the other components, may be modified from that illustrated and described herein, depending on factors such as the construction material and techniques used and the intended use for the rod, for example, fly, spin, or other casting.

What is claimed is:

1. A fishing rod having a butt end and tip end, the rod comprising a fiber-reinforced hollow shaft defining an inner passageway for a line extending from a point near the butt end to the tip end, said inner passageway for the line extending substantially parallel to a longitudinal axis of the shaft;

the shaft having a line entrance opening near the butt end, and a tip end opening for egress of the line at the tip end; and the shaft having a plurality of perforations disposed between the line entrance opening and the tip end.

2. The rod of claim 1 wherein the perforations are spaced longitudinally along the shaft and distributed about the circumference of the hollow shaft rod such that some of the perforations are disposed at or near a bottom portion of the shaft and some of the perforations are disposed at or near a top portion of the shaft.

3. The rod of claim 2 wherein adjacent perforations are disposed alternately at or near the top and bottom portion of the shaft.

4. The rod of claim 1 wherein at least some of the perforations are elongated, with the longitudinal axis thereof oriented generally parallel with the longitudinal axis of the shaft.

5. The rod of claim 1 wherein the size and number of perforations in the shaft are sufficient to allow air flow into and out of the hollow shaft to facilitate dispersal of water from the shaft.

6. The rod of claim 1 wherein the size, number and proximity of perforations in the shaft are limited to maintain the structural integrity of the shaft.

7. The rod of claim 1 wherein the area of the perforations are from about 10% to 50% of the inside diametrical area of the shaft.

8. The rod of claim 1 wherein the area of the perforations are from about 15% to 40% of the inside diametrical area of the shaft.

9. The rod of claim 1 wherein adjacent perforations are spaced longitudinally from one another along the shaft a distance of from 5 to 50 times the inside diameter of the shaft.

10. The rod of claim 1 wherein adjacent perforations are spaced longitudinally from one another along the shaft a distance of from 10 to 30 times the inside diameter of the shaft.

11. The rod of claim 1 wherein the shaft includes reinforcing means disposed about the perforations.

12. The rod of claim 1 wherein the shaft includes reinforcing means disposed about the line entrance opening.

13. The rod of claim 1 wherein the shaft includes wear resisting means associated with the tip end opening.

14. The rod of claim 1 wherein the inner surface of the shaft is coated with a wear resisting material.

15. The rod of claim 1 wherein the inner surface of the shaft is coated with a water repellant material.

16. The rod of claim 1 wherein the inner surface of the shaft is provided with an irregular surface for reducing contact area of the line with said inner surface.

\* \* \* \* \*